United States Patent
Aiken et al.

(12) 
(10) Patent No.: US 6,228,143 B1
(45) Date of Patent: May 8, 2001

(54) ROTARY THERMAL OXIDIZER FOR BATTERY RECYCLING AND PROCESS

(75) Inventors: Victor Henry Aiken, Pickering (CA); Russell R. Bleakney, New Galilee; Richard H. Hanewald, Franklin, both of PA (US); Ahmed Vahed, Mississauga; Anthony Edward Moline Warner, Burlington, both of (CA)

(73) Assignee: The International Metals Reclamation Company, Inc., Ellwood City, PA (US)

( * ) Notice: Subject to any disclaimer, the term of this patent is extended or adjusted under 35 U.S.C. 154(b) by 0 days.

(21) Appl. No.: 09/484,750

(22) Filed: Jan. 18, 2000

(51) Int. Cl.$^7$ .................................................. C22B 1/00

(52) U.S. Cl. .............................. 75/403; 266/205; 429/49

(58) Field of Search .................. 75/403; 266/205; 429/49

(56) References Cited

U.S. PATENT DOCUMENTS

| 4,401,463 | 8/1983 | Melin et al. | 75/44 |
| 5,252,189 | 10/1993 | Celi | 204/104 |
| 5,437,705 | 8/1995 | DeLisle et al. | 75/403 |

FOREIGN PATENT DOCUMENTS 191 752  *  1/1986  (EP) ........................... 75/403

* cited by examiner

*Primary Examiner*—Melvyn Andrews
(74) *Attorney, Agent, or Firm*—Edward A. Steen

(57) ABSTRACT

A rotary thermal oxidizer removes polymeric and other non-metal components of exhausted batteries and cells leaving value-metals, such as cadmium, nickel, and iron behind for subsequent processing. By preheating the sweep gas to a temperature above the auto-ignition temperature of the polymers, prior to their introduction into the oxidizer, and controlling the oxygen content within the oxidizer the risks of explosion and fire associated with the pyrometallurgical recycling of the cells is substantially reduced.

25 Claims, 1 Drawing Sheet

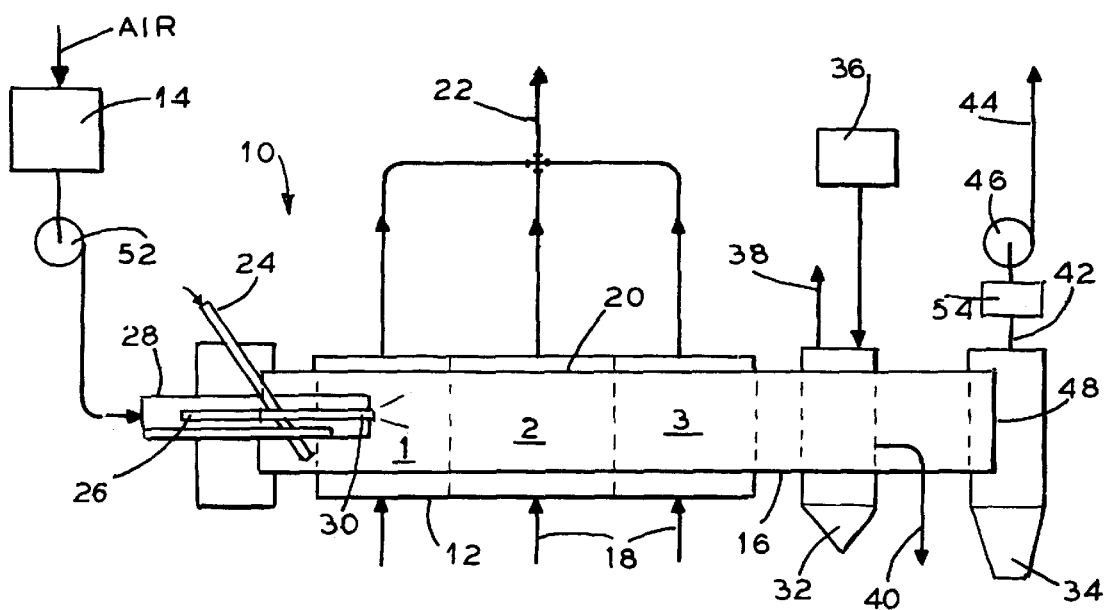

ROTARY THERMAL OXIDIZER FOR BATTERY RECYCLING AND PROCESS

TECHNICAL FIELD

The instant invention relates to battery recycling techniques in general, and more particularly, to an efficient apparatus and method for safely separating valuable recoverable materials from the polymer components of spent cells.

BACKGROUND ART

Exhausted primary and secondary batteries and cells face increasingly stringent rules regarding disposal. In particular, environmental regulations require the responsible handling and treatment of cadmium—a primary component in nickel-cadmium cells. Cadmium is a poison that wreaks havoc with living systems. Accordingly, various separating systems have been developed to recover and recycle cadmium and nickel from retired cells.

Nickel-cadmium cells and battery packs are typically contained in and/or are held together by polymeric or plastic materials. Cells include nickel, cadmium, paper, cardboard, water, electrolyte and assorted polymers. In order to separate the cadmium nickel and iron from the remaining materials, the cells are usually heated in controlled environments. Other processes utilize hydrometallurgy techniques for separation and recovery.

Typically, the polymers and other non-valuables are pre-treated in static bed furnaces to heat the cells until the polymers are vaporized followed by the use of an after burner and rapid quenching to destroy any dioxin/furan compounds that may form prior to gas discharge to the atmosphere. This batch technique is substantially limited to the volume of the stationary furnace, requiring cycle times up to 24 hours. Heating is not uniform and it is difficult to control the temperature in a static bed where various exothermic reactions occur. Water has to be used to quench run-away reactions resulting in a wet product with incomplete plastic removal.

Recycling methods employing pyrometallurgical techniques generally shred the polymeric cell cases to free up the internal cell components. The crushed scrap is then heated in a furnace to vaporize the cadmium. The gaseous cadmium is condensed and is generally solidified as ingot, granules or other desired shapes. The residue, mainly consisting of nickel and iron, is subsequently treated to make a nickel-iron alloy pig.

U.S. Pat. No. 4,401,463 to Melin et al. discusses an involved batch pyrometallurgical process wherein the scrapped batteries are preheated prior to the pyrolysis of the cadmium. Vaporization of the cadmium occurs in the presence of an inert gas and a small quantity of oxygen. The non-continuous technique requires laboriously locomoting the treated batches through several stations prior to casting of the cadmium.

U.S. Pat. No. 5,437,705 to DeLisle et al. deposits the shredded innards of nickel-cadmium batteries in a furnace along with the addition of an oxygen getter, such as carbon, to prevent oxidation. An inert blanket gas, preferably argon, is used to maintain the reducing atmosphere in the furnace. Cadmium cubes and nickel-iron residue are produced.

U.S. Pat. No. 5,252,189 to Celi discloses a process for separating the metal and plastic components from mercury containing cells. The cells are fed into a slightly heated rotating ball mill where the tumbling action of the balls in conjunction with the low grade heat separates the components for subsequent treatment. Heated inert gas, such as nitrogen, is fed into the mill and is eventually washed with sulfuric acid to free up the mercury. The now separated plastic and metal residues are subsequently and independently treated.

In order to efficiently and economically recycle spent nickel-cadmium cells by recovering the cadmium and nickel, the plastic, water and paper must be eliminated. Raising the temperature of the various hydrocarbon polymeric packing material in combination with the contents of the cells past their auto ignition temperatures in a closed vessel such as a furnace strongly creates the possibility of an explosion and fire. Indeed, in the assignee's experience, the utilization of a large rotary calciner, ostensibly having an inert atmosphere, resulted in undesirable explosions and fires caused by the unintended entrainment of oxygen in the vessel.

Accordingly, there is a need for an apparatus and method to safely and efficiently remove polymeric components, water, and other non-metal values from battery packs and cells while minimizing the fuming of the noxious elements from the batteries.

SUMMARY OF THE INVENTION

Accordingly, there is provided a continuous thermal oxidizer for removing polymers (plastics), water, and other non-metal values contained in electrolytic energy sources while controlling the gas temperature to prevent overheating the batteries and cells.

The thermal oxidizer includes provision to preheat the sweep gas entering the oxidizer to adequately heat the cells and initiate polymer combustion under controlled conditions. An internal water spray protects the oxidizer by controlling its internal temperature thereby controlling the combustion of the entrained polymeric components and thereby avoiding the possibility of explosions. An explosion plate is included in the discharge housing as a safety device.

BRIEF DESCRIPTION OF THE DRAWINGS

The FIGURE is a schematic representation of an embodiment of the invention.

PREFERRED EMBODIMENT OF THE INVENTION

Referring to the FIGURE, there is shown a continuous thermal oxidizing system 10 incorporating a rotary furnace 16 which initiates polymer/plastic combustion under controlled conditions. Preheated air is introduced into the furnace 16 to help raise the temperature of the unwanted plastic to above auto-ignition temperatures.

The term "about" before a series of values, unless otherwise indicated, shall be interpreted as applying to each value in the series.

The furnace 16, which is preferably a rotary kiln heated externally by a muffle 12, is coupled with a sweep gas preheater 14 that substantially boosts the temperature of the air introduced into the furnace/kiln 16.

The rotary kiln 16 includes an interior rotating shell 20 circumscribed by the muffle 12. The muffle 12 has a plurality of burners 18. The shell 20 is indirectly heated by natural gas combustion generated by the burners 18. Other types of heating such as electric, etc., may be used as well.

The muffle 12 and hence the furnace 16 is substantially subdivided into three heating zones 1, 2 and 3. Each zone 1, 2 and 3 is preferably equipped with six burners 18 each for a total of eighteen burners 18. The zones 1, 2 and 3 have their own temperature monitoring equipment known to those skilled in the art.

As alluded to previously, the kiln's original design (a rotary calciner) called for indirect heating of the furnace 16 via the burners 18 to a temperature sufficiently high to volatize the plastic components of the cells and batteries under a supposedly inert atmosphere. However, because of uncontrolled air leakage, debilitating fires and explosions resulted. It was determined that preheated air should be affirmatively introduced into the furnace 16 by fan 52 to safely combust the polymers and plastics. Accordingly, the primary heat source of the furnace 16 is now the preheated air raised to a temperature of about 1250° F. (677° C.) supplemented by the burners 18. Significant heat is generated also by the combustion of the entrained polymers/plastics.

As a result of the preheated air being introduced into the furnace, the burners 18 now act as auxiliary heat sources. A series of automated or manual controls tied to thermocouples arrayed at various locations about the furnace 16 will fire up, modulate and/or shut down individual burners 18 as necessary to maintain the proper internal temperatures.

It is preferred to allow air to pass through non-energized burners during operations to help control the shell 20 temperature from the internal combustion of the plastics.

Burner combustion by-products are routed through an exhaust vent 22.

Waste batteries, previously weighed and metered, are introduced into the furnace 16 via valved feed pipe 24. The control valve (not shown) for the feed pipe 24 is biased closed so that in the event of an emergency shut down, the valve will shut, closing the furnace 16 and preventing emissions from escaping into the atmosphere.

The sweep gas pre-heater 14 supplies pre-heated air to the furnace 16 via a eight to twelve inch (20.3–30.5 mm) diameter sweep gas conduit 28 projecting into zone 1. The air flow further provides excess oxygen to support the combustion of the polymers and maintain a residual oxygen content in the resultant off-gas exiting from the furnace 16.

The preheater 14 includes a natural gas burner capable of heating the air stream to 1100–1350° F. (593–732° C.) which is well above the auto-ignition temperature of the hydrocarbon compounds generated from heated ABS and other plastics typically found in battery packs. This pre-heated air stream and heated shell 20 initiates and maintains the combustion of the plastics. By maintaining high input temperatures, the pre-heated air will significantly reduce the risk of concentrating uncombusted volatile plastics as explosive gas mixtures with air below the auto-ignition temperature, which previously caused explosions. The flow of the air into and through the preheater 14 is modulated by flow equipment known to those skilled in the art. Air flow rates is a function of the battery flow rates and the quantity of plastic content.

A prototype furnace 16 has a shell 20 of about three feet (0.91 m) diameter by about 45.5 feet (13.87 m) long. The plurality of burners 18 have a total heat output of about $4.5 \times 10^6$ BTU/hr ($1.2 \times 10^6$ watts). The air preheater 14 is capable of delivering about $2 \times 10^6$ BTU/hour ($5.8 \times 10^5$ watts).

The combustion of the contained plastics will result in heat generation that must be controlled in order to maintain the shell 20 temperature below the limits imposed by the materials of construction. In the prototype design, a maximum heat released of about $7.1 \times 10^6$ BTU/hr ($2.03 \times 10^6$ watts) will occur at a design rate of about 1760 pounds/hour (798 kg/hr) of batteries containing approximately 20% plastics. It is believed that most, if not all, of the combustion takes place within zone 1.

An atomizing spray lance 26 with a nozzle 30 is inserted through the feed breaching of the shell 16. The lance 26 extends along the center line of the sweep gas conduit 28. Water atomized with air by the nozzle 30 will absorb heat as the atomized water is converted to steam. The lance 26 is arranged within the shell 20 to avoid impingement of the water spray on the interior walls of the shell 20. The nozzle 30 is designed for about a 20 degree included angle spray that will also reduce the probability of impingement.

The temperature of the products of combustion is detected at the end of the shell 20 by appropriate detectors. Due to a temperature limitation of about 1400° F. (760° C.) imposed by the materials of construction, high temperature and high-high temperature alarms are set at 1300° F. (704° C.) and 1350° F. (732° C.) respectively. The preferred setpoint of 1250° F. (677° C.) is maintained by controlling the water flow to the atomizing spray lance 26. The atomizing air is supplied at a constant 65 scfm (1.84 m³m) at 45 psig ($3.1 \times 10^5$ Pa). The air and/or water must be flowing through the lance 26 at all times to protect the lance 26 and nozzle 30 against high temperature excursions.

The purpose of a shell cooler 32 is to indirectly cool the roasted batteries prior to discharge for subsequent treatment to reduce any fuming. Water from source 36 is sprayed about the outside of the shell 20 and its flow rate can be manually adjusted using a valve (not shown) upstream of the product discharge 34. The condensate from the cooler 32 is routed to a floor trench connected to wastewater treatment and the steam 38 is routed through the roof. An overflow line 40, which prevents the rotating shell 16 from being submerged in cooling water, drains to the floor.

The off-gas from the furnace 16 is routed away via the off-take 42, sampled and analyzed for oxygen and combustibles content. A furnace sample probe (not shown) extends through the discharge breaching and into the shell 20.

A combustibles indicator/controller detects in the 0 to 5% (0–50,000 ppm) range. An oxygen indicator detects in the 0 to 21% range. The furnace 16 operation is designed to produce very low levels of combustibles and a residual oxygen concentration greater than 3%.

A suitably sized process off-gas fan 46 draws the products of combustion and other particulate from the discharge end of the rotary kiln 16 through an evaporative cooler 54 and discharges the off-gas 44 to a rotary hearth furnace (RHF) (not shown) for secondary treatment prior to discharge to atmosphere. The fan 46 motor speed is modulated to maintain a negative pressure of about –0.2 w.c. (49.8 Pa) inside the rotary kiln 12. A negative pressure in the rotary kiln 12 is preferred to minimize uncontrolled air leakage and prevent uncombusted hydrocarbons and potential cadmium vapors and cadmium oxide from venting to the atmosphere. Sampling ports for environmental testing are installed in the discharge line 42 of the fan 46.

The resultant calined batteries including cadmium, nickel and iron are discharged from the shell 20 through a breach and isolation valve 48 before falling into a container (not shown) located inside the product discharge 34. The container is accessed by a suitable locomoting device such as a forklift. The contents of the container are transferred to a cadmium furnace for subsequent separation of the cadmium and the remaining materials.

The kiln 16 will continue to operate while the valve 48 is closed. In order to prevent fugitive emissions from escaping to the environment from the kiln 12, the valve 48 should be sufficiently robust to hold the weight of the batteries and be capable of shearing through them when closing.

In the prototype furnace 16 described above up to about 9 gallons/minute (34 l/min) of water may be introduced through the nozzle 30 to enable the throughput rate to be about 450–1760 pounds/hour (204–798 kg/hr) with a plastics composition of about 2–35% by weight plastics. The treated batteries are typically discharged at about 150°–400° F. (66°–207° C.). Each zone 1, 2 and 3 should be heated about 1000°–1250° F. (538–677° C.) with a battery maximum of about 1350° F. (732° C.). The hot gases must be treated in an environmentally responsible manner to ensure the destruction of dioxin or furan compounds. Preferably this includes heating the gases from the furnace 16 to about 1800° F. (982° C.) for a minimum of one second and then immediately quenching these gases to about 500° F. (260° C.) in the evaporative cooler 54 downstream the off-take 42. An afterburner (not shown) or a RHF may be used to treat the off-gas.

Oxygen content of the off-gas should be greater than about 8% in order to ensure complete combustion of the hydrocarbon compounds. Combustibles content of the off-gas gas should be less than 2% to avoid formation of an explosive mixture of hydrocarbon compounds.

The shell 20 rotation speed is variable from about 1–5 revolutions per minute (preferably 3–4 rpm). The shell 20 is sloped about 5% by jacking up one end of the kiln 12 to gravity drive the treated materials toward the product discharge 34.

Product retention time in the kiln 16 is approximately 60 minutes.

The treated cells have been conditioned by the furnace 10 so that all the plastic, paper, cardboard, electrolyte and other non-value materials have been removed leaving the principle metal components (cadmium, nickel and iron) ready for further processing for metals recovery by techniques known to those skilled in the art.

Although the thrust of the present invention has been directed towards nickel-cadmium cells, the rotary furnace 10 may be utilized to remove plastic, paper, cardboard electrolyte and other components from other types of battery systems (such as nickel-metal hydride, lithium-ion, carbon-zinc, alkaline, zinc-air, nickel-iron, lead acid, button cells, etc.)

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A rotary thermal oxidizer for removing polymeric materials and other non-metal values from cells and batteries, the oxidizer comprising a rotating shell, a plurality of shell heaters, an input source of sweep gas connected to the oxidizer, an air preheater associated with the input source of sweep gas, a product discharge connected to the oxidizer, a material feeder affixed to the oxidizer, and a product gas off-take connected to the oxidizer.

2. The rotary thermal oxidizer according to claim 1 including a shell cooler, the shell cooler connected to a source of cooling fluid, and a vent connected to the shell cooler.

3. The rotary thermal oxidizer according to claim 1 wherein the air preheater is adapted to heat air up to about 1350° F. (732° C.).

4. The rotary thermal oxidizer including a source of water adapted to be introduced into the interior of the rotating shell.

5. The rotary thermal oxidizer according to claim 4 including a water lance disposed within the shell.

6. The rotary thermal oxidizer according to claim 5 wherein the water lance is coincident with the sweep gas.

7. The rotary thermal oxidizer according to claim 1 wherein a sweep gas conduit extends into the shell.

8. The rotary thermal oxidizer according to claim 1 wherein a plurality of burners are directed towards the shell.

9. The rotary thermal oxidizer according to claim 1 wherein the product gas off-take is connected to a rotary hearth furnace.

10. The rotary thermal oxidizer according to claim 1 including a shell heater exhaust gas off-take.

11. The rotary thermal oxidizer according to claim 1 including a muffle surrounding the shell.

12. The rotary thermal oxidizer according to claim 11 wherein the muffle includes a plurality of the shell heaters.

13. The rotary thermal oxidizer according to claim 1 including a feed pipe at least partially extending into the interior of the shell.

14. The rotary thermal oxidizer according to claim 1 wherein the shell is divided into a plurality of individual heatable zones.

15. The rotary thermal oxidizer according to claim 1 wherein the rotating shell is sloped.

16. A process for removing polymeric and non-metallic components from energy cells, the process comprising:

a) introducing the cells to a heatable rotating shell, b) preheating air above the auto-ignition temperature of the polymeric components, c) introducing the preheated air into the shell as a sweep gas, d) maintaining the internal temperature of the shell above the auto-ignition temperature of the polymeric components, e) causing the energy cells to traverse the rotating shell for a period of time sufficient to volatize the polymeric components, f) venting the gases generated by the combustion of the volatilized polymeric components from the shell, and g) discharging treated solids from the shell.

17. The process according to claim 16 wherein a water spray is cointroduced with the preheated air into the shell to modulate the temperature of the shell.

18. The process according to claim 16 wherein the shell is divided into a plurality of zones, and the zones heatable by a series of burners.

19. The process according to claim 16 wherein a shell cooler circumscribes the shell downstream the heating zones of the shell, and introducing a cooling fluid into the shell cooler to cool the treated solids prior to their discharge.

20. The process according to claim 16 including heating and to about 1800° F. (982° C.) and rapidly cooling the gases to approximately 500° F. (260° C.) generated in the shell to destroy toxic compounds therein.

21. The process according to claim 16 including routing the gases generated in the shell to a rotary hearth furnace.

22. The process according to claim 16 including heating the preheated air up to about 1350° F. (732° C.).

23. The process according to claim 16 including subdividing the shell into a plurality of heating zones.

24. The process according to claim 23 including maintaining the temperatures of the heating zones between 1000° F.–1350° F. (538–732° C.).

25. The process according to claim 16 including routing the gases through air evaporative cooler.

* * * * *